United States Patent
Cho

(10) Patent No.: US 11,280,407 B2
(45) Date of Patent: Mar. 22, 2022

(54) SHIFT CONTROL METHOD FOR VEHICLE WITH DCT

(71) Applicants: Hyundai Motor Company, Seoul (KR); Kia Motors Corporation, Seoul (KR)

(72) Inventor: Sung Hyun Cho, Yongin-si (KR)

(73) Assignees: Hyundai Motor Company, Seoul (KR); Kia Motors Cornoration, Seoul (KR)

( * ) Notice: Subject to any disclaimer, the term of this patent is extended or adjusted under 35 U.S.C. 154(b) by 173 days.

(21) Appl. No.: 16/834,209

(22) Filed: Mar. 30, 2020

(65) Prior Publication Data

US 2021/0172518 A1 Jun. 10, 2021

(30) Foreign Application Priority Data

Dec. 9, 2019 (KR) ........................ 10-2019-0162904

(51) Int. Cl.
| | |
|---|---|
| *F16H 61/688* | (2006.01) |
| *F16H 59/18* | (2006.01) |
| *F16H 59/44* | (2006.01) |
| *F16H 59/68* | (2006.01) |
| *F16H 59/14* | (2006.01) |
| *F16H 59/36* | (2006.01) |

(52) U.S. Cl.
CPC ........... *F16H 61/688* (2013.01); *F16H 59/18* (2013.01); *F16H 59/44* (2013.01); *F16H 59/68* (2013.01); *F16H 2059/147* (2013.01); *F16H 2059/366* (2013.01); *F16H 2710/22* (2013.01)

(58) Field of Classification Search
CPC ........... F16H 61/688; F16H 2061/0012; F16H 59/18; F16H 59/44; F16H 59/68; F16H 59/366; F16H 59/14; F16H 59/36; F16H 59/56; F16H 2059/147; F16H 2059/0012
See application file for complete search history.

(56) References Cited

U.S. PATENT DOCUMENTS

| | | | |
|---|---|---|---|
| 2016/0123465 A1* | 5/2016 | Cho | ........................ F16D 48/06 477/176 |
| 2018/0163853 A1* | 6/2018 | Cho | ...................... F16H 61/688 |

FOREIGN PATENT DOCUMENTS

KR 20190066417 A 6/2019

* cited by examiner

*Primary Examiner* — Ernesto A Suarez
*Assistant Examiner* — Lori Wu
(74) *Attorney, Agent, or Firm* — Slater Matsil, LLP

(57) ABSTRACT

A shift control method can be used for a vehicle with a dual-clutch transmission (DCT). A controller determines whether or not a power-on upshift is initiated in a state in which a high performance mode has been selected. The controller performs a torque phase in which a coupling-side clutch torque is gradually increased and a release-side clutch torque is gradually released. The coupling-side clutch torque is gradually increased to a target coupling-side clutch torque corresponding to a value obtained by adding a push feel torque to a base torque. The controller performs an inertia phase in which the coupling-side clutch torque is gradually increased while tracing an engine torque such that an engine speed is synchronized with a coupling-side clutch speed. The controller completes speed change through gradual decrease of the coupling-side clutch torque.

17 Claims, 3 Drawing Sheets

SHIFT CONTROL METHOD FOR VEHICLE WITH DCT

CROSS-REFERENCE TO RELATED APPLICATIONS

This application claims priority to Korean Patent Application No. 10-2019-0162904, filed on Dec. 9, 2019, which application is hereby incorporated herein by reference.

TECHNICAL FIELD

The present invention relates to a technology associated with a shift control method of a vehicle mounted with a dual-clutch transmission (DCT).

BACKGROUND

General DCT vehicles perform shift control mainly to minimize gear shift impact generated during gear shift, thereby preventing the user from feeling gear shift.

However, upon speed change, some users need fast speed change feeling and fast acceleration feeling rather than smooth speed change feeling. The present invention is related to a technology for satisfying such needs of users.

The above matters disclosed in this section are merely for enhancement of understanding of the general background of the invention and should not be taken as an acknowledgement or any form of suggestion that the matters form the related art already known to a person skilled in the art.

SUMMARY

Embodiments of the present invention provide a shift control method of a vehicle with a dual-clutch transmission (DCT) enabling the vehicle to form a faster speed change feeling and a higher acceleration feeling during power-on upshift, thereby realizing high-performance vehicle driving feeling.

In accordance with an aspect of the present invention, a shift control method for a vehicle can be used with a dual-clutch transmission (DCT). A controller determines whether or not power-on upshift is initiated in a state in which a high performance mode has been selected. The controller performs a torque phase in which a coupling-side clutch torque is gradually increased to a target coupling-side torque corresponding to a value obtained by adding a push feel torque to a base torque, and a release-side clutch torque is gradually released. The control performs an inertia phase in which the coupling-side clutch torque is gradually increased while tracing an engine torque such that an engine speed is synchronized with a coupling-side clutch speed. The controller completes speed change through gradual decrease of the coupling-side clutch torque.

The base torque in the performing the torque phase may be a value set to the target coupling-side clutch torque upon power-on upshift in a state in which the high performance mode is not selected. The base torque may be determined in accordance with a vehicle speed and an engine torque.

The push feel torque may be added to the base torque in the state in which the high performance mode is selected, to constitute the target coupling-side clutch torque. The push feel torque may be determined in accordance with the vehicle speed and the engine torque.

The push feel torque may be set to have a value increased as the vehicle speed or the engine torque increases.

The torque phase may be performed for a target torque phase time set in accordance with an accelerator pedal manipulation amount. When the target torque phase time elapses, and the release-side clutch torque becomes 0 or less, it may be determined that the torque phase is completed.

In the inertia phase, the coupling-side clutch torque may be gradually increased from a value obtained by deducting, from the engine torque, a torque gap corresponding to a difference between the engine torque and the coupling-side clutch torque when the torque phase is completed.

When an estimated residual synchronization time until the engine speed is synchronized with the coupling-side clutch speed is equal to a predetermined reference time or less, execution of the inertia phase may be completed, and completing speed change may be performed.

In the completing speed change, the coupling-side clutch torque may be gradually decreased under a condition that a maximum decrease of the coupling-side clutch torque is limited to the push feel torque.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF ILLUSTRATIVE EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
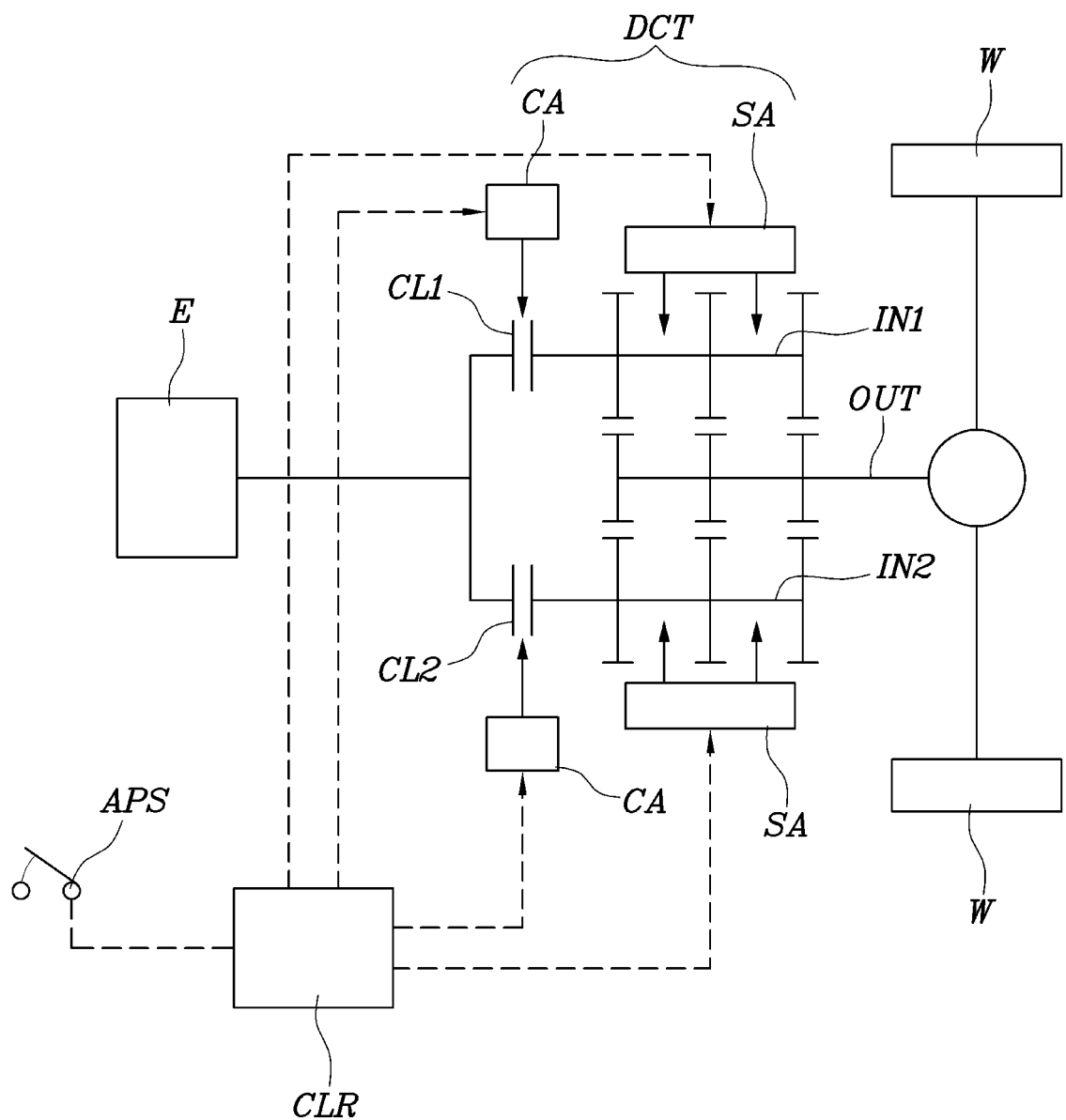
FIG. 1 is a view illustrating a powertrain of a vehicle mounted with a dual-clutch transmission (DCT) to which the present invention is applicable.

FIG. 1 illustrates a powertrain of a vehicle mounted with a dual-clutch transmission (DCT) to which the present invention is applicable. Drive power of an engine E is input to a first input shaft IN1 and a second input shaft IN2 via a first clutch CL1 and a second clutch CL2, respectively. Speed-changed drive power is supplied to drive wheels W via an output shaft OUT.

The first clutch CL1 and the second clutch CL2 are operable to be coupled to or separated from each other by a clutch actuator CA. A shift actuator SA is installed to perform gear shift through change of engaged shift gears. The clutch actuator CA and the shift actuator SA are controlled by a controller CLR. The controller CLR is configured to receive an accelerator pedal manipulation amount via an accelerator position sensor (APS).

Of course, the controller CLR performs gear shift by receiving additional information such as an engine RPM and an engine torque, and controlling the clutch actuator CA and the shift actuator SA based on the received additional information. The controller CLR also receives information as to whether or not a high performance mode is selected by the user, and performs different control operations according to the received information.

Here, the high performance mode means a driving mode not only realizing faster speed change feeling rather than smooth speed change feeling, even though the speed change feeling is more or less rough, but also realizing higher acceleration feeing. It may be possible for the user to select the mode by selecting the mode or a sports mode of a highest level through a separately-provided switch or selecting the mode through manual manipulation of a shift lever.

Figure 2:
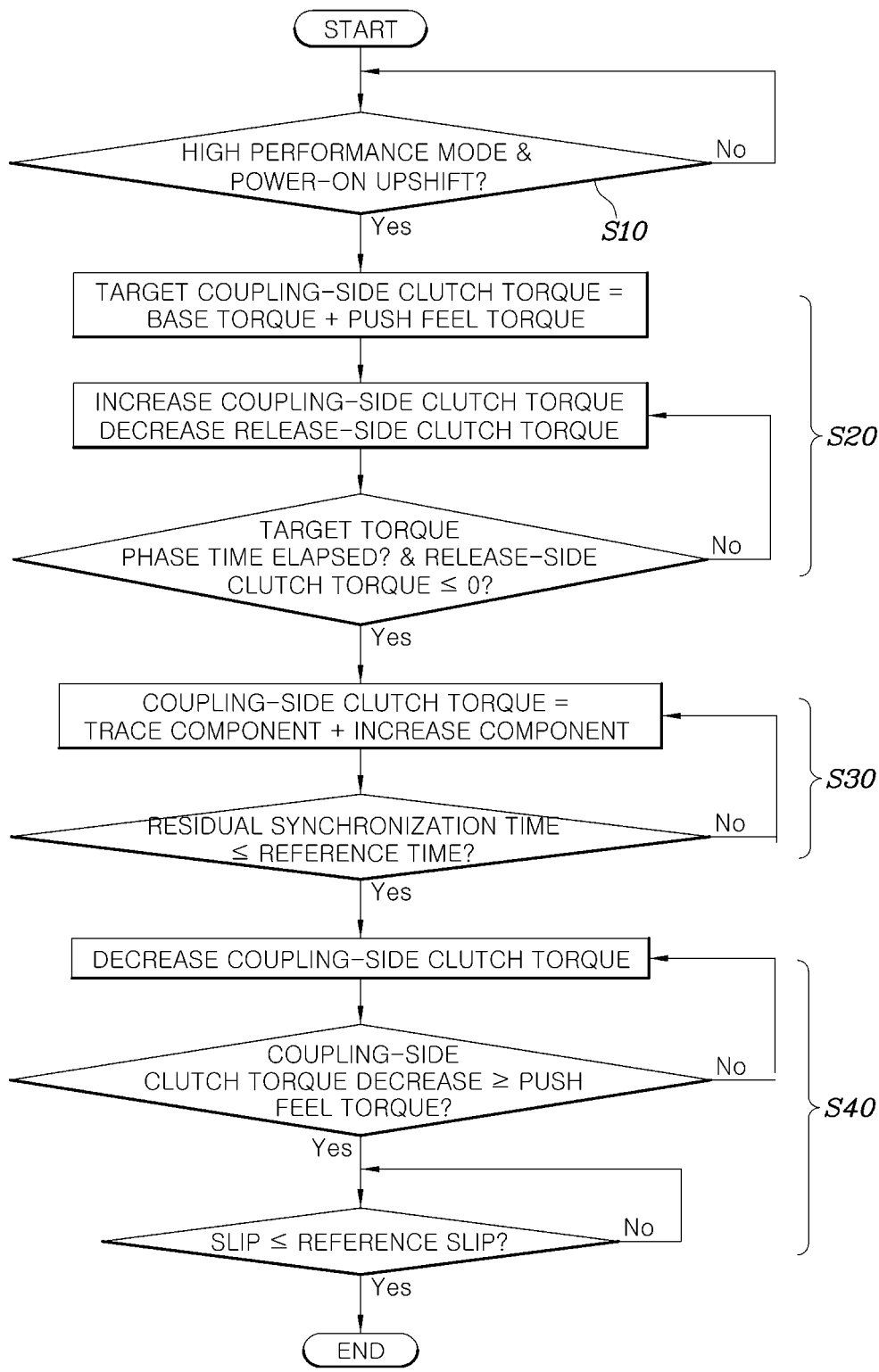
FIG. 2 is a flowchart illustrating a shift control method of a DCT vehicle according to an embodiment of the present invention.
Figure 3:
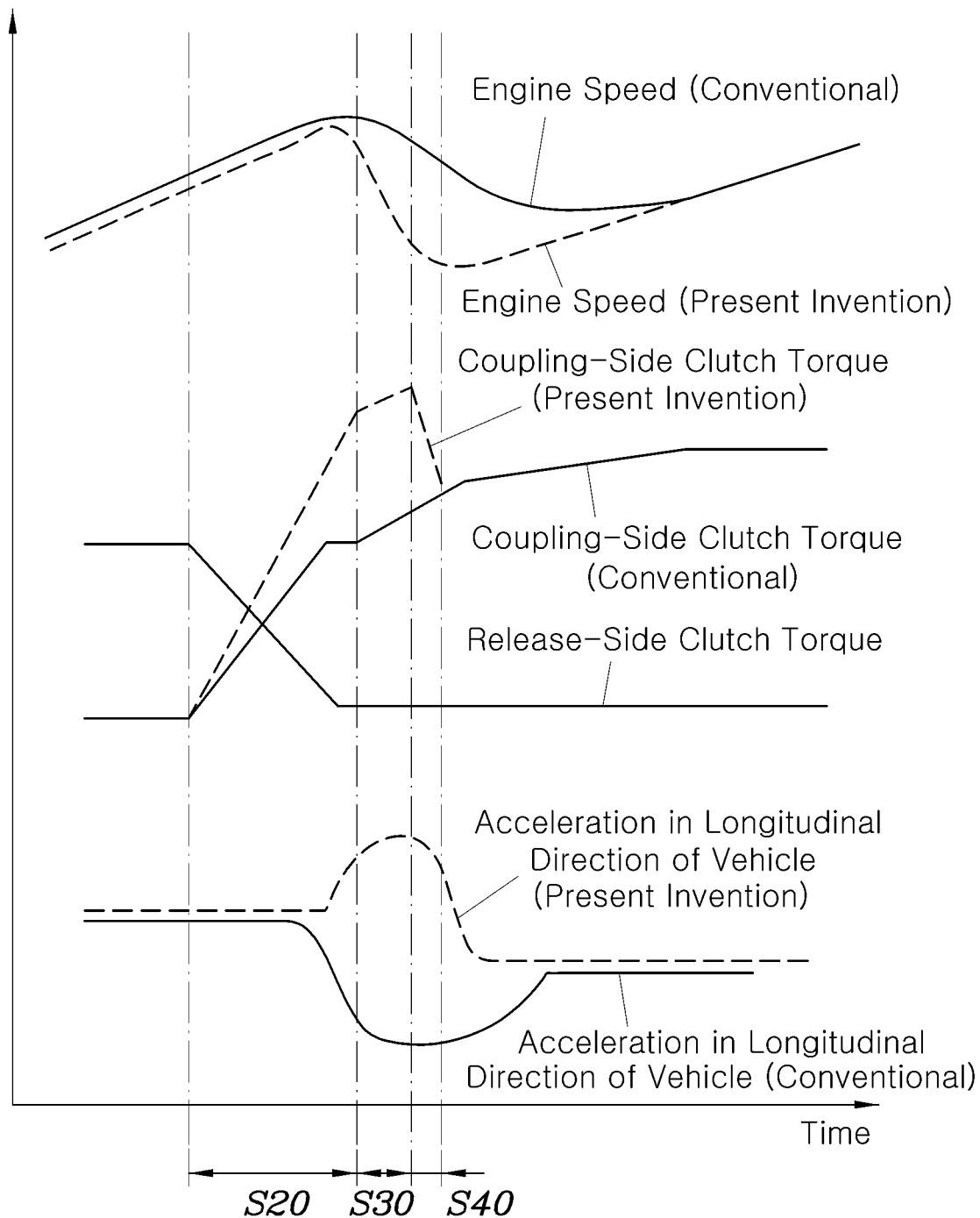
FIG. 3 is a graph explaining the shift control method of the DCT vehicle according to the embodiment of the present invention.

Referring to FIG. 2, a shift control method of the DCT vehicle according to an embodiment of the present invention includes steps of determining, by the controller CLR, whether or not power-on upshift is initiated in a state in which a high performance mode has been selected (S10), performing, by the controller CLR, a torque phase in which a coupling-side clutch torque is gradually increased to a target coupling-side torque corresponding to a value obtained by adding a push feel torque to a base torque, and a release-side clutch torque is gradually released (S20), performing, by the controller CLR, an inertia phase in which the coupling-side clutch torque is gradually increased while tracing an engine torque such that an engine speed is synchronized with a coupling-side clutch speed (S30, and completing, by the controller CLR, speed change through gradual decrease of the coupling-side clutch torque (S40).

The base torque in the step of performing the torque phase is a value set to the target coupling-side clutch torque upon power-on upshift in a state in which the high performance mode is not selected. The base torque is determined in accordance with a vehicle speed and an engine torque.

That is, in accordance with the present invention, in a torque phase performed upon power-on upshift in a state in which the high performance mode is selected, the target coupling-side clutch torque itself is additionally increased by the push feel torque such that the coupling-side clutch torque is increased within a faster time and, as such, the synchronization of the engine speed with the coupling-side clutch speed is consequently more rapidly achieved, and the engine torque may be transmitted in an increased quantity to the drive wheels via the coupling-side clutch, thereby achieving an increase in vehicle acceleration feeling.

For reference, power-on upshift means that the driver performs gear shift to a higher shift stage in a state of depressing an accelerator pedal.

Typically, torque phase is a procedure of only changing a clutch transmitting a torque while maintaining engine speed. Assuming that the first clutch CL1 has transmitted the drive power of the vehicle in the state of FIG. 1, the torque phase means that the torque of the first clutch CL1 is released through gradual release of the first clutch CL1, and the torque of the second clutch CL2 is increased through gradual coupling of the second clutch CL2.

Of course, gears of the current shift stage connected to the second clutch CL2 should be in an engaged state before initiation of the torque phase. Here, the clutch released upon gear shift is referred to as a "release-side clutch". Gears of the previous shift stage are in a connected state to the release-side clutch, and gears of the target shift stage, that is, the current shift stage, are in a connected state to the coupling-side clutch.

In addition, the inertia phase typically means a procedure of synchronizing the engine speed with the coupling-side clutch speed by varying the engine speed under the condition that torques of the clutches are maintained without variation.

For reference, the period until speed change is completed in accordance with complete synchronization of the engine speed with the coupling-side clutch speed during power-on upshift may be considered the inertia phase. Accordingly, it may be considered that step S40 of completing the speed change in the present invention belongs to the inertia phase.

In accordance with the present invention, when a request for gear shift to a higher shift stage is generated as the driver depresses the accelerator pedal in a state in which a high performance mode has been selected by the driver, the controller CLR determines this situation, and then performs the torque phase under the condition that a value obtained by adding a push feel torque to a base torque is set to a target coupling-side clutch torque.

That is, when a high performance mode is not selected, the target coupling-side clutch torque is set to the base torque in the torque phase. However, when a high performance mode is selected, the push feel torque is added to the base torque, and the resultant value is set to the target coupling-side clutch torque. In this case, in the torque phase, the torque of the coupling-side clutch is gradually increased toward the target coupling-side torque, and the torque of the release-side clutch is gradually decreased toward 0.

For reference, the base torque is determined in accordance with vehicle speed and engine torque, as described above. In the torque phase, the coupling-side clutch torque is gradually increased, and the release-side clutch torque is gradually decreased under the condition that the sum of the coupling-side clutch torque and the release-side clutch torque is equal to the engine torque. In this regard, theoretically, the base torque is determined based on the engine torque. In practice, however, it is preferred that the base torque be set to be increased in accordance with an increase in engine torque while being set to be slightly decreased in accordance with an increase in vehicle speed, taking into consideration inertia according to the vehicle speed of the vehicle.

The push feel torque, which is added to the base torque in a state in which the high performance mode has been selected, to form the target coupling-side clutch torque, is determined in accordance with the vehicle speed and the engine torque.

That is, the push feel torque is an important factor for inducing faster speed change feeling and higher acceleration feeling in the present invention. In accordance with the present invention, the push feel torque is set to have an increasing tendency at a higher vehicle speed because the speed difference between the engine speed and the synchronization speed (the coupling-side clutch speed) is increased at a higher vehicle speed. The push feel torque is also set to be increased in accordance with an increase in engine torque.

The torque phase is performed for a target torque phase time set in accordance with an accelerator pedal manipulation amount. When the target torque phase time elapses, and the release-side clutch torque becomes 0 or less, it is determined that the torque phase is completed.

For reference, the target torque phase time may be set to be increased as the accelerator pedal manipulation amount increases.

In the above-described torque phase, the coupling-side clutch torque may be determined in a current control cycle t of the controller CLR, as follows:

coupling-side clutch torque($t$)=coupling-side clutch torque($t-1$)+[target coupling-side clutch torque−coupling-side clutch torque($t-1$)]/(target torque phase time−torque phase elapse time)

where target coupling-side clutch torque=base torque+push feel torque, and $t-1$: previous control cycle.

The release-side clutch torque may be determined in the current control cycle t of the controller CLR, as follows:

release-side clutch torque(t)=release-side clutch torque(t−1)+[target release-side clutch torque−release-side clutch torque(t−1)]/(target torque phase time−torque phase elapse time)

where
target release-side clutch torque=0, and
t−1: previous control cycle.

In the inertia phase, the coupling-side clutch torque is gradually increased from a value obtained by deducting, from the engine torque, a difference between an engine torque and a coupling-side clutch torque when the torque phase is completed, that is, a torque gap.

That is, in the inertia phase initiated immediately after the torque phase, the coupling-side clutch torque is basically varied while tracing a variation in engine torque. However, the coupling-side clutch torque is determined to be a sum of a trace component to cause the coupling-side clutch torque to trace a variation in engine torque while maintaining the torque gap when the torque phase is completed and an increase component to cause the coupling-side clutch torque to be gradually increased with passage of time.

This may be expressed as follows:

coupling-side clutch torque(t)=trace component(t)+increase component trace component(t)=engine torque(t)−torque gap torque gap=engine torque(when the torque phase is completed)−coupling-side clutch torque(when torque phase is completed)

increase component=ramp increase.

That is, in the present invention, in the inertia phase, the coupling-side clutch torque is gradually increased with passage of time in accordance with the increase component and, as such, the engine speed can be more rapidly synchronized with the coupling-side clutch speed, differently from a general inertia phase.

When an estimated residual synchronization time until the engine speed is synchronized with the coupling-side clutch speed is equal to a predetermined reference time or less, execution of the inertia phase is completed, and a step of completing the speed change is performed.

The residual synchronization time may be calculated with reference to a variation in engine speed. The reference time is a residual time when it can be determined that synchronization has almost been completed. For example, the reference time may be set to 50 ms.

In step S40 of completing speed change, the coupling-side clutch torque is gradually decreased. In this case, the maximum decrease is limited to the push feel torque.

That is, the present invention realizes faster speed change feeling and higher acceleration feeling by additionally applying a push feel torque to the coupling-side clutch in the torque phase, differently from general power-on upshift. To this end, a value corresponding to the push feel torque applied as described above is gradually deducted from the coupling-side clutch torque at a time when speed change is completed and, as such, the speed change completion state in the present invention is returned to the same state as a general speed change completion state.

When a slip, which is a difference between an engine speed and a coupling-side clutch speed, becomes a predetermined reference slip or less after the coupling-side clutch torque is decreased as described above, it is determined that speed change is completed, and speed change control may then be completed. The reference slip may be variously set in accordance with multiple experiments and analysis. For example, the reference slip may be set to 50 RPM.

As apparent from the above description, the present invention enables a vehicle with a DCT to form faster speed change feeling and higher acceleration feeling during power-on upshift, thereby realizing high-performance vehicle driving feeling.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A shift control method for a vehicle with a dual-clutch transmission (DCT), the method comprising:
   determining, by a controller, whether or not a power-on upshift is initiated in a state in which a high performance mode has been selected;
   performing, by the controller, a torque phase in which a coupling-side clutch torque is gradually increased and a release-side clutch torque is gradually released, the coupling-side clutch torque being gradually increased to a target coupling-side clutch torque corresponding to a value obtained by adding a push feel torque to a base torque;
   performing, by the controller, an inertia phase in which the coupling-side clutch torque is gradually increased while tracing an engine torque such that an engine speed is synchronized with a coupling-side clutch speed; and
   completing, by the controller, speed change through gradual decrease of the coupling-side clutch torque.

2. The shift control method according to claim 1, wherein, when performing the torque phase, the base torque is a value set to the target coupling-side clutch torque upon the power-on upshift in a state in which the high performance mode is not selected, and the base torque is determined in accordance with a vehicle speed and the engine torque.

3. The shift control method according to claim 2, wherein the push feel torque is added to the base torque in the state in which the high performance mode is selected, to constitute the target coupling-side clutch torque, and the push feel torque is determined in accordance with the vehicle speed and the engine torque.

4. The shift control method according to claim 3, wherein the push feel torque is set to have a value increased as the vehicle speed or the engine torque increases.

5. The shift control method according to claim 1, wherein:
   the torque phase is performed for a target torque phase time set in accordance with an accelerator pedal manipulation amount; and
   when the target torque phase time elapses and the release-side clutch torque becomes zero or less, it is determined that the torque phase is completed.

6. The shift control method according to claim 1, wherein, in the inertia phase, the coupling-side clutch torque is gradually increased from a value obtained by deducting, from the engine torque, a torque gap corresponding to a difference between the engine torque and the coupling-side clutch torque when the torque phase is completed.

7. The shift control method according to claim 1, wherein execution of the inertia phase is completed when an estimated residual synchronization time until the engine speed is synchronized with the coupling-side clutch speed is equal to a predetermined reference time or less, and wherein completing the speed change is performed after execution of the inertia phase is completed.

8. The shift control method according to claim 1, wherein, in completing the speed change, the coupling-side clutch torque is gradually decreased under a condition that a maximum decrease of the coupling-side clutch torque is limited to the push feel torque.

9. A controller for use in a vehicle with a dual-clutch transmission (DCT), the controller being configured to:
determine whether or not a power-on upshift is initiated in a state in which a high performance mode has been selected;
perform a torque phase in which a coupling-side clutch torque is gradually increased and a release-side clutch torque is gradually released, the coupling-side clutch torque being gradually increased to a target coupling-side clutch torque corresponding to a value obtained by adding a push feel torque to a base torque;
perform an inertia phase in which the coupling-side clutch torque is gradually increased while tracing an engine torque such that an engine speed is synchronized with a coupling-side clutch speed; and
complete speed change through gradual decrease of the coupling-side clutch torque.

10. A vehicle with a dual-clutch transmission (DCT), the vehicle comprising:
a first clutch;
a second clutch;
a first shift actuator;
a second shift actuator; and
a controller coupled to the first clutch, the second clutch, the first shift actuator, and the second shift actuator, the controller configured to:
determine whether or not a power-on upshift is initiated in a state in which a high performance mode has been selected;
perform a torque phase in which a coupling-side clutch torque is gradually increased and a release-side clutch torque is gradually released, the coupling-side clutch torque being gradually increased to a target coupling-side clutch torque corresponding to a value obtained by adding a push feel torque to a base torque;
perform an inertia phase in which the coupling-side clutch torque is gradually increased while tracing an engine torque such that an engine speed is synchronized with a coupling-side clutch speed; and
complete speed change through gradual decrease of the coupling-side clutch torque.

11. The vehicle according to claim 10, wherein, when performing the torque phase, the base torque is a value set to the target coupling-side clutch torque upon the power-on upshift in a state in which the high performance mode is not selected, and the base torque is determined in accordance with a vehicle speed and the engine torque.

12. The vehicle according to claim 11, wherein the push feel torque is added to the base torque in the state in which the high performance mode is selected, to constitute the target coupling-side clutch torque, and the push feel torque is determined in accordance with the vehicle speed and the engine torque.

13. The vehicle according to claim 12, wherein the push feel torque is set to have a value increased as the vehicle speed or the engine torque increases.

14. The vehicle according to claim 10, wherein:
the torque phase is performed for a target torque phase time set in accordance with an accelerator pedal manipulation amount; and
when the target torque phase time elapses and the release-side clutch torque becomes zero or less, it is determined that the torque phase is completed.

15. The vehicle according to claim 10, wherein, in the inertia phase, the coupling-side clutch torque is gradually increased from a value obtained by deducting, from the engine torque, a torque gap corresponding to a difference between the engine torque and the coupling-side clutch torque when the torque phase is completed.

16. The vehicle according to claim 10, wherein execution of the inertia phase is completed when an estimated residual synchronization time until the engine speed is synchronized with the coupling-side clutch speed is equal to a predetermined reference time or less, and wherein completing the speed change is performed after execution of the inertia phase is completed.

17. The vehicle according to claim 10, wherein, in completing the speed change, the coupling-side clutch torque is gradually decreased under a condition that a maximum decrease of the coupling-side clutch torque is limited to the push feel torque.

* * * * *